Sept. 20, 1960   O. V. MURPHY   2,953,262
POWER MOLD DUMP
Filed Feb. 21, 1958   4 Sheets-Sheet 1

INVENTOR.
OSCAR V. MURPHY
BY
Price and Heneveld
ATTORNEYS

Sept. 20, 1960

O. V. MURPHY 2,953,262

POWER MOLD DUMP

Filed Feb. 21, 1958

INVENTOR.
OSCAR V MURPHY
BY Price and Heneveld
ATTORNEYS

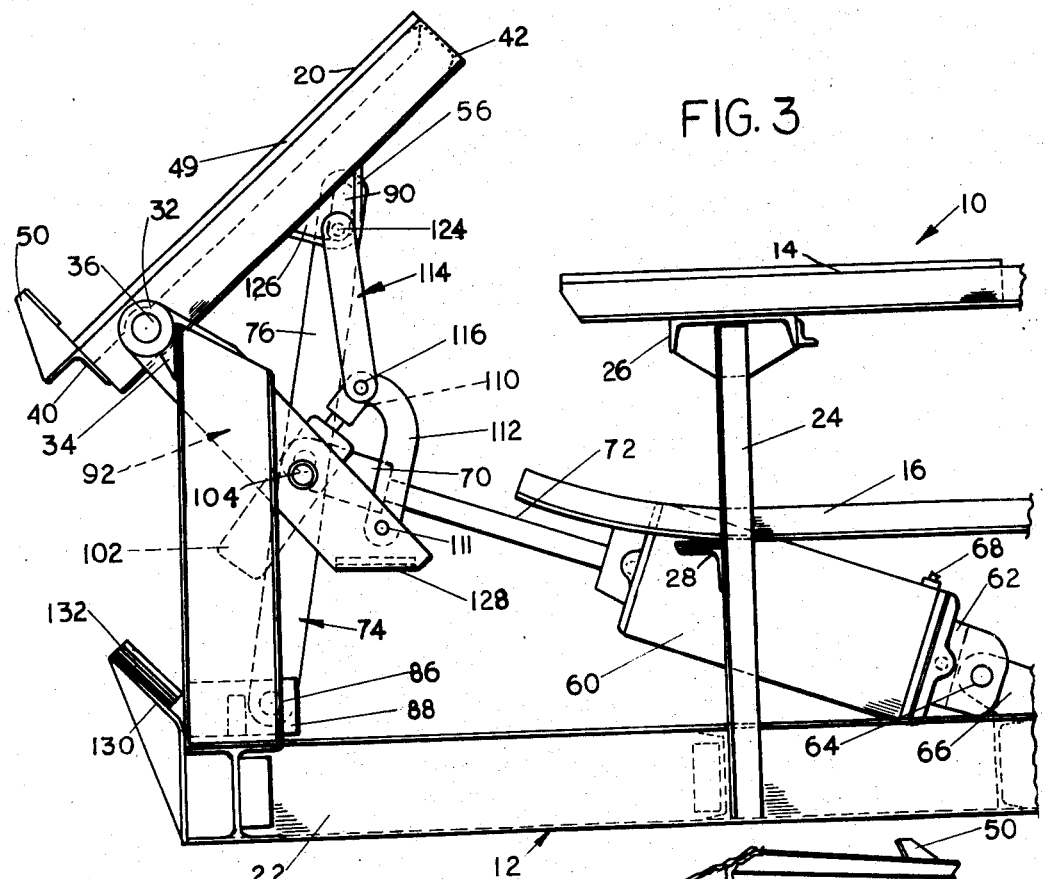
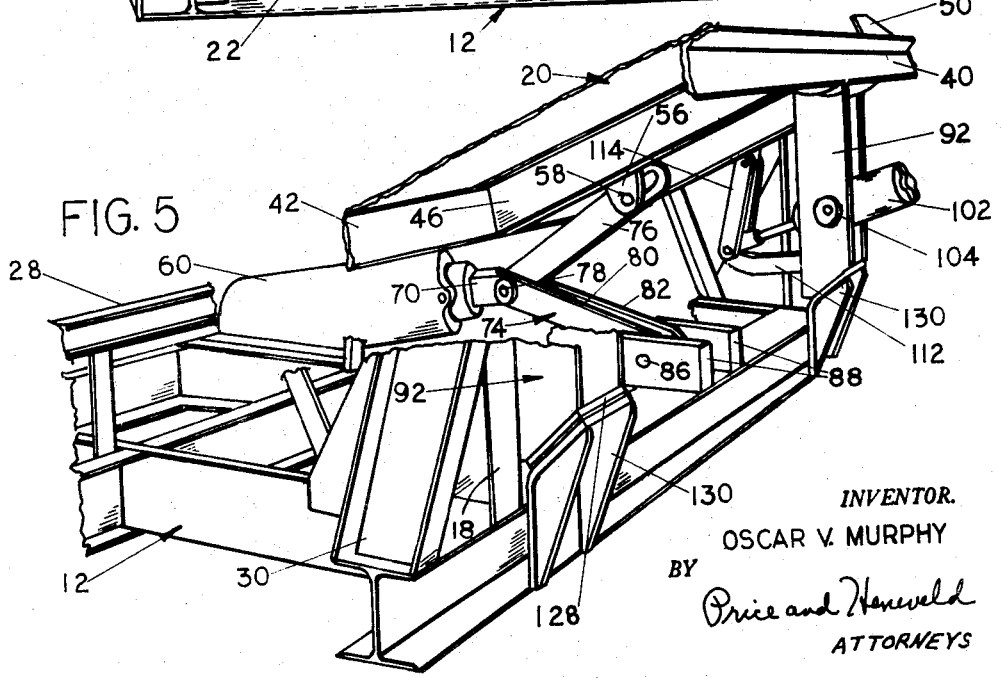

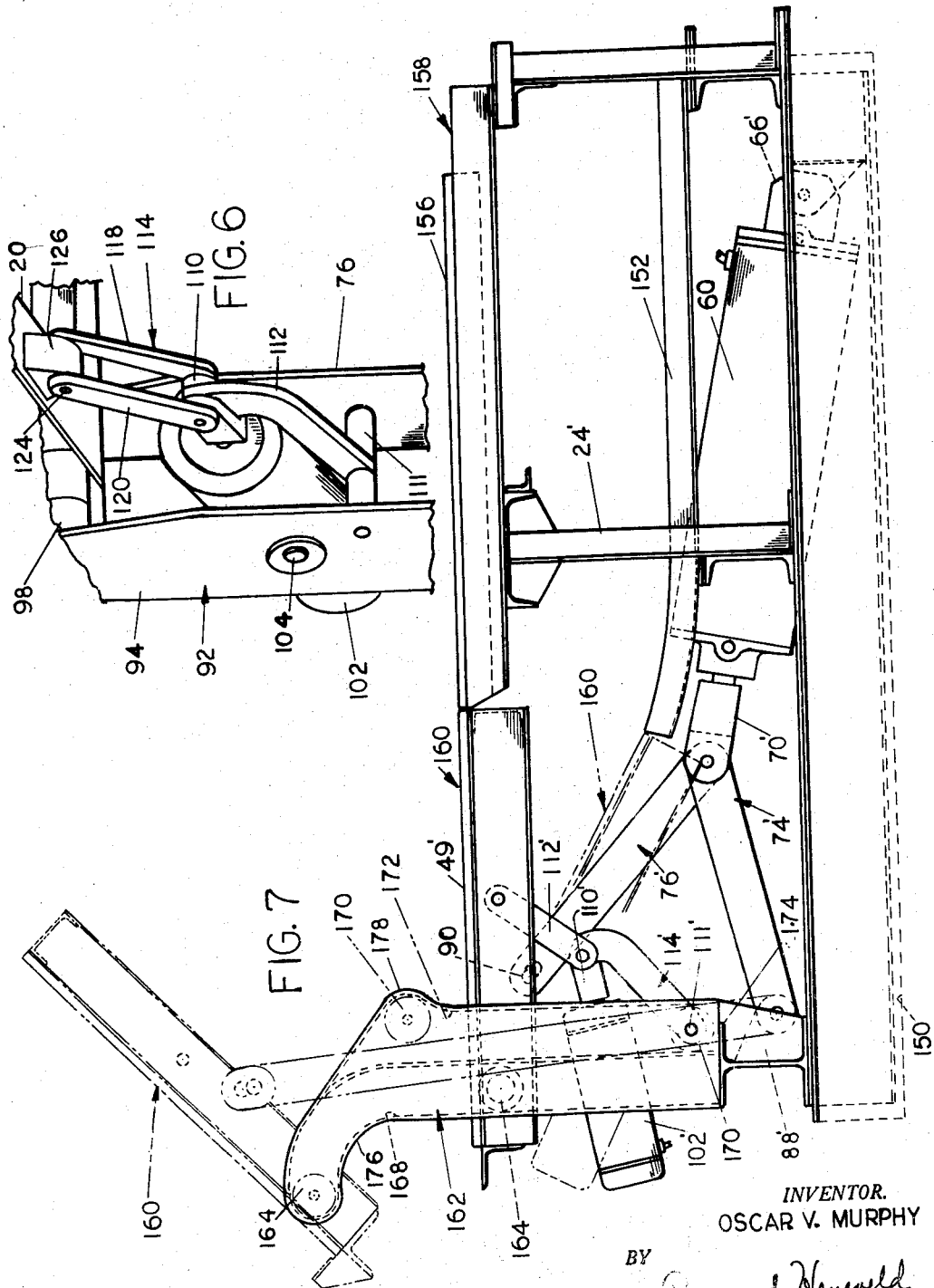

United States Patent Office 2,953,262
Patented Sept. 20, 1960

2,953,262
POWER MOLD DUMP

Oscar V. Murphy, Newaygo, Mich., assignor to Newaygo Engineering Company, Newaygo, Mich., a corporation of Michigan Filed Feb. 21, 1958, Ser. No. 716,784

13 Claims. (Cl. 214—46.22)

This invention relates to apparatus for unloading foundry molds and their castings from a foundry mold conveyor, and more particularly to a power operated apparatus capable of separating the foundry mold and its casting from a pallet carrier and returning the pallet carrier for subsequent use.

It is common in the mass production of cast parts to have foundry molds placed on carrier pallets so that after the molten metal is poured and while it is cooling the mold and casting may be moved to another location. Generally the carrier pallet is disposed on some form of conveyor for transporting the mold and casting to a shaker table, where the casting is separated from the mold. The mold and castings together are separated from the pallet carrier at a dump table. The dump table is at the end of the conveyor and can be tilted to cause the mold and casting to slide off the pallet. The pallet is then returned so that it can be used again.

The most common type of foundry conveyor for this purpose is a gravity feed conveyor having simple guide rails and receiving a wheeled pallet carrier. As a rule an upper and lower set of pallet guide track are provided; both are inclined for gravity feed, but in the opposite direction. In this way a loaded pallet may be carried to the mold dump on one track and the unloaded pallet may be returned on the other track. With this type of conveyor system the mold dump table must be operable between positions aligned with the receiving track, tilted to dump the mold and casting, and aligned with the return track.

The operating mechanism for a dump table is mounted under the dump table. This space is quite limited because it is at the lower end of the conveyor. Quite frequently a pit or dugout must be provided to accommodate such operating mechanism. Furthermore, the dump table operating mechanism requires considerable space because of the size of the power actuators and the angle at which they are usually disposed to operate the dump table.

The table operating power actuators are generally hydraulic cylinders. Where only one such cylinder is used it is of considerable size to provide the necessary power and stroke to raise a loaded dump table and to later position the table in alignment with the pallet return track. In those instances in which two separate power cylinders have been used they have still been large and expensive cylinders requiring a long stroke and full load sustaining power.

This invention is directed to an improved form of power operated dump table and the actuating mechanism therefore. The dump table is operable through the same sequence of positions previously used. However, the dump table and its supporting and its operating mechanism is different than that previously known or used.

It is an object of this invention to provide a power operated dump table having power actuated means of operating the table which require less space than previous operating means for such tables. This eliminates the need for a dugout or pit to accommodate the operating mechanism for the dump table.

Another object of this invention is to teach the use of separate power cylinders for operating a dump table. Cylinders of different and smaller size than have previously been required may be used. One power cylinder is mounted on the conveyor frame and is adapted to raise the table to a tilted position. Another power cylinder or a pair of cylinders is mounted on the dump table and is operative in lowering the table to the pallet returning position.

It is also an object of this invention to teach a dump table operating mechanism in which the power actuators are not required to carry the full load of the dump table at all time.

A further object of this invention is to teach an interrelation of table operating mechanisms whereby they co-operate together in positioning the dump table and maintaining it in certain given positions.

A still further object of this invention is to teach the use of power cylinders and their operating mechanism in a manner which eliminates the need for any retractable stops to retain the dump table in a given position. The different table operating mechanisms may be used to provide different table positioning supports and may be withdrawn when required.

These and other advantages of this invention will be apparent in the illustrated and disclosed form of this invention hereinafter set forth.

In the drawings:

Fig. 3 is a side elevation view of the dump device of Fig. 1 and having the dump table disposed in a mold dumping position.

Fig. 5 is a perspective view of the mold dumping device with the dump table disposed in a pallet returning position as shown in Fig. 4. Parts of the structure in Fig. 5 are broken away to better illustrate certain features of this invention.

Fig. 6 is a perspective view of a part of the disclosed mold dump device.

Fig. 7 is a side elevation view of a modification of the mold dump device shown by Figs. 1 through 6.

Figures 1, 4:
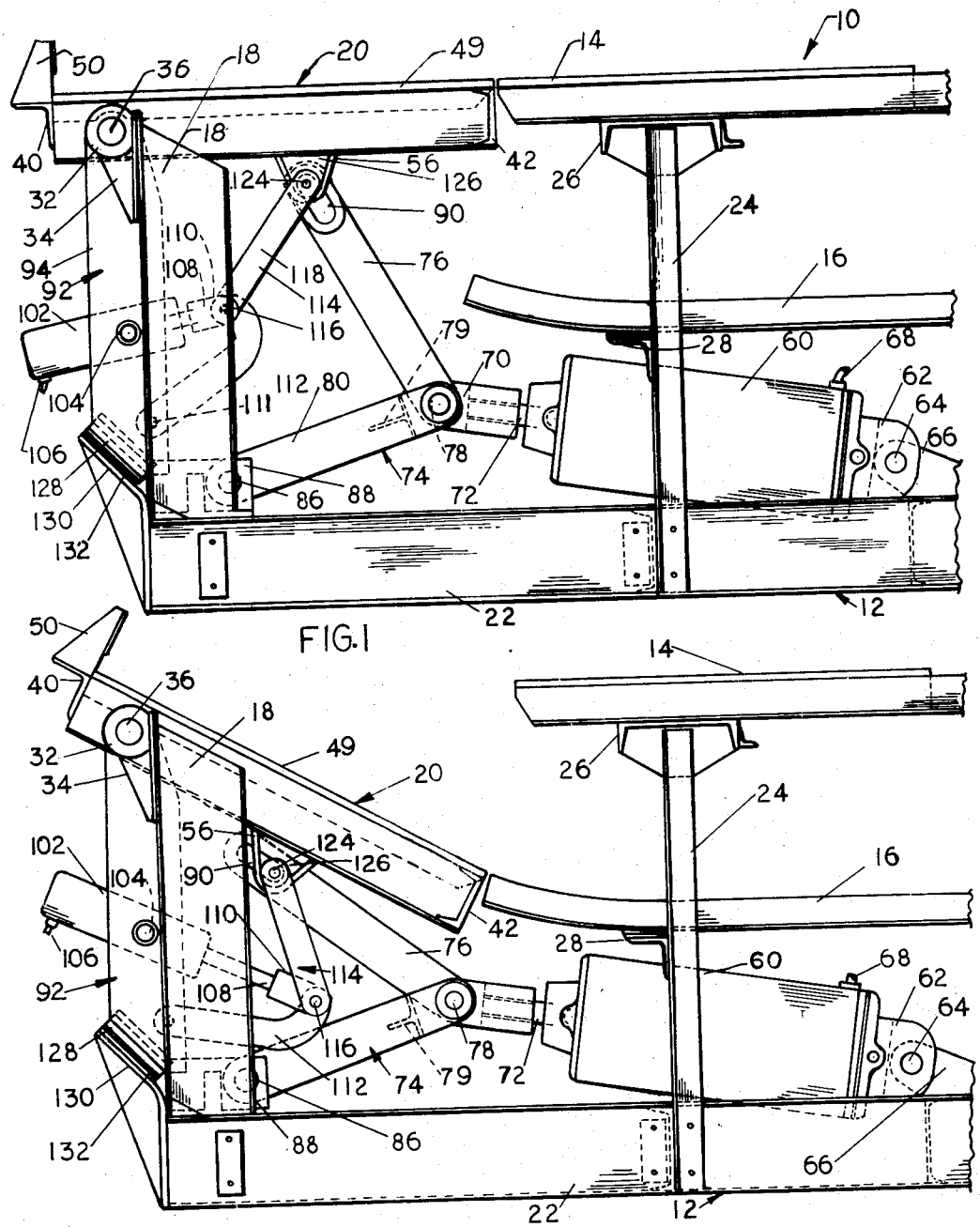
Fig. 1 is a side elevation view of a dump table device including the teachings of this invention and having the dump table thereof disposed in a load receiving position.
Fig. 4 is a side elevation view of the same dumping device with the dump table disposed in a pallet returning position.
Figure 2:
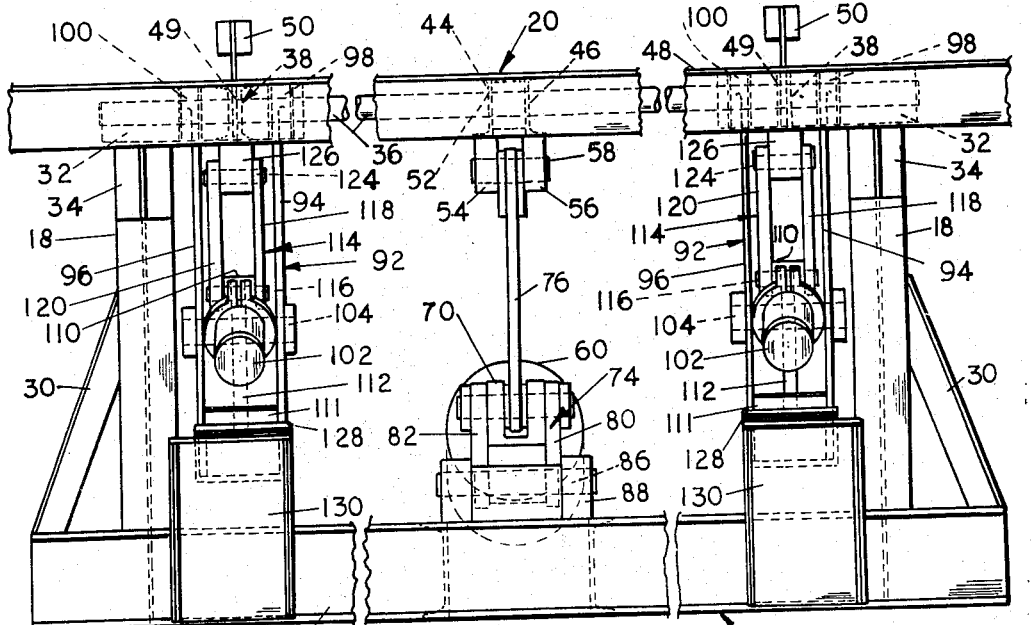
Fig. 2 is an end view of the dumping device shown by Fig. 1, with the dump table in the same position.

In brief, the disclosed foundry mold dump is mounted at the end of a gravity feed mold conveyor. The conveyor includes an upper guide track and a lower guide track. The foundry mold dump includes a dump table which is pivotally mounted on the frame of the conveyor and may be positioned in alignment with both guide tracks. The dump table includes table supporting braces which hold the table aligned with the upper guide track. A power cylinder actuates the table to a dump position by means of certain operating members which also serve to brace the table in the dump position. After this same power cylinder has returned the dump table to the horizontal position, another pair of power cylinders are employed to inactivate the table supporting braces and to move the dump table into alignment with the lower guide track for the return of the unloaded pallet.

Referring to the drawings in more detail, the foundry mold conveyor 10 includes a frame 12 supporting an upper gravity feed conveyor track 14 and a lower gravity feed conveyor track 16. A dump table 20 is pivotally mounted on the vertically disposed standards 18 at the end of the conveyor frame 12. The upper guide track 14 of the conveyor is inclined towards the dump table 20 and the lower track 16 is inclined away from the dump table.

The conveyor frame 12 is formed by I-beams, channel and angle iron supports and braces. The base 22 of the frame is supported on the foundry floor. Vertical supports 24 are secured to the base 22 and the guide rails or tracks 14 and 16 are mounted on cross supports 26 and 28 secured thereto. The standards 18, which supports the dump table 20, are reinforced by braces 30 engaged with the frame base.

Shaft bearings 32 are secured to the standards 18 and are supported by gusseting brackets 34. A shaft 36 extends through the bearings 32 and is engaged with the reinforcing ribs 38 provided on the underside of the dump table 20. Thus the dump table 20 is pivotal on the shaft 36.

The dump table 20 includes strengthening members such as the ribs 38, end forming members 40 and 42, and spaced channels 44 and 46. A surface plate 48 is provided on the top of the dump table. The reinforcing ribs 38 are formed by spaced channels which have a guide rail 49 secured therebetween. The guide rails 49 stick up above the surface of the dump table and are aligned to complement the spacing of the conveyor rails 16 and 18. Stops 50 are secured to the end of the dump table 20 in line with the guide rails 49. The channels 44 and 46 have a shaft bearing 52 secured therebetween and the shaft 36 also extends through it. A pair of spaced lugs 54 and 56 are also secured to the channels 44 and 46. A pivot pin 58 is secured between the lugs and a part of the table operating mechanism is engaged therewith.

The table operating mechanism includes a primary power actuator cylinder 60 which is mounted on the conveyor frame 12 under the guide rails 16 and 18. The power cylinder 60 includes an end bracket 62 by means of which it is pivotally engaged on a pin 64 to a bracket 66 secured to the conveyor frame base 22. The cylinder 60 is hydraulically operated by a power supply source connected thereto at 68. A coupling 70 is secured to the end of the piston rod 72 of the power cylinder 60 and operating links 74 and 76 are pivotally engaged therewith. The coupling 70 includes a pivot pin 78 with which the links 74 and 76 are engaged. The one link 74 includes spaced straps 80 and 82. Link 74 has its other end engaged with a pivot pin 86 provided on a frame bracket 88. The other link 76 has an elongated slot 90 formed in its end to receive the pivot pin 58 provided on the underside of the dump table 20.

The primary power actuated cylinder 60 is adapted to raise the dump table 20 from the horizontally disposed position, shown in Fig. 1, to the tilted or dump position shown in Fig. 3. The operation of the power cylinder 60 and its operating links 74 and 76, to accomplish this, will be described later.

The dump table 20 is held in the horizontally disposed position, shown by Fig. 1, by certain table supporting and operating mechanism mounted on the underside of the dump table and on each side of the primary table operating mechanism. This mechanism includes table support members 92 which are pivotally mounted on the shaft 36 which supports the dump table 20. The table supporting members 92 include spaced arms 94 and 96 having shaft bearings 98 and 100 provided at their upper ends and engaged with the table supporting shaft 36. A small power actuated cylinder 102 is mounted between the arms 94 and 96 on a pivot pin connector 104. The power cylinder 102 is a hydraulic cylinder controlled by a power source connected thereto at 106. The piston rod 108 of the cylinder includes a coupling 110 with which the secondary table operating links 112 and 114 are engaged. The details of this mechanism is best shown by Fig. 6. The one link 112 is engaged between the pivot pin 116 of the coupling 110 and a pivot pin 111 provided on the depending table supporting member 92. The other operating link 114 includes a pair of straps 118 and 120 engaged with a pivot pin 124 of a lug 126 provided on the underside of the dump table 20.

The table operating links 112 and 114 provide a collapsible knee-brace between the dump table 20 and the support member 92. The support member 92 includes a foot piece 128 which is engaged with a stop 130 secured to the conveyor frame base 22. When the knee-brace linkage 112 and 114 is erected, the table support member 92 is disposed and held at substantially right angles to the dump table 20. The foot piece 128 of the support is engaged with the stop 130 and the dump table is held in a horizontally disposed position. This position may be varied as necessary for alignment with the guide track 16 by shims 132 received between the foot piece 128 and the stop 130.

On the return of the dump table 20 from the tilted or dump position, of Fig. 3, to the horizontally disposed position, the secondary power cylinders 102 may be activated to pivotally break the knee-brace supports and to move the dump table 20 to the lower tilted position shown by Fig. 4. The elongated slot 90 of the primary operating linkage enables this movement independent of the primary table operating mechanism.

A further description of the functions of the different parts of the dump table operating mechanisms is best given in the operating sequence of the dump table.

Operation

The dump table 20 is held in a horizontally disposed position by the erected knee-brace formed by operating links 112 and 114 which holds the table support 92 engaged with the limit stop 130. The operating links 112 and 114 are disposed in an over center relation by the power cylinder 102 and in such position hold the piston of the cylinder fully retracted. Consequently, the brace alone holds the dump table 20 in aligned relation with the upper guide track 16 and in position to receive a loaded pallet thereon. No load is imposed on the primary cylinder 60 or on its operating links 74 and 76.

After a pallet and its load are received on the dump table the power cylinder 60 is activated. Operating link 74 pivots about its frame connection and moves link 76 upward to the limit of the lost motion connection of slot 90 before raising the dump table to the position shown by Fig. 3. The power cylinder 60 moves the operating links 74 and 76 to a slightly over center relation so that the load of the dump table acts to hold the cylinder rod 72 fully extended. Thus the load of the dump table 20 is again removed from the power actuating cylinder 60.

When the dump table 20 is tilted to the position shown by Fig. 3 the pallet is engaged with the stops 50 and the foundry mold and casting slide off the pallet.

After the dumping operation, cylinder 60 is again activated, this time to collapse the over center support formed by operating links 74 and 76 and to return the dump table 20 to a horizontally disposed position. At the moment the primary power cylinder 60 is spent the secondary power actuating cylinders 102 are placed in operation. Cylinders 102 serve to collapse the knee-brace formed by operating links 112 and 114. Very little effort is required to collapse the support brace since the dump table is already on the down stroke and the table is unloaded. Thus very small power cylinders are all that is necessary.

The cylinder 102 pivots on support 92 as it collapses the support brace and relocates the table 20 into alignment with the pallet return track 16. The elongated slot 90 in the link 76 prevents interference with the primary table positioning mechanism. Either or both the limit of the slot 90 or the full stroke of the cylinder 102 may control the positioning of the dump table 20 in alignment with the pallet return track. A stop 79 may also be provided within the operating link 74 for such purpose.

After the pallet is discharged from the dump table 20 the knee-brace of links 112 and 114 is again erected, by cylinder 102, and the table is positioned in line with track 14 to receive another pallet.

Modification

In certain instances it may be necessary to have such a long conveyor that the lower end will be too low to pass the foundry mold and casting to the next operation. Or, previous stations may require a lower conveyor bed and as a result the discharge end may prove too low to effectively discharge the molds and castings from the pallet.

Figure 8:
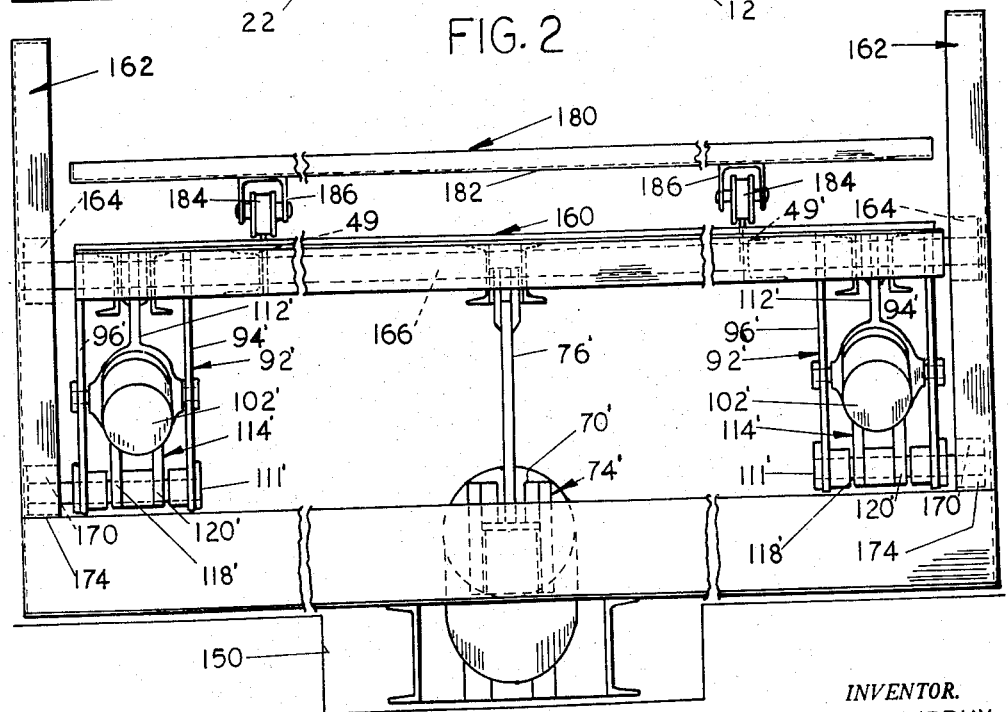
Fig. 8 is an end view of the mold dump device of Fig. 7.

The present invention is adaptable to provide a lifting of the dump table as well as a tilting thereof. The necessary modification is shown by Figs. 7 and 8.

In the modified structure a pit or dugout 150 may be required. This depends on the space provided between the lower guide rail 152 and the ground level, in which the primary power cylinder 60' is to be located. An upper guide track or railway 156 is provided above the lower guideway 152. Both are mounted on the conveyor frame 158.

The dump table 160 is pivotally mounted on the end of the conveyor frame 158. However, vertically disposed double track guide rails 162 are provided at each end of the dump table in place of the upright standards, as is shown by Fig. 8. Rollers 164 are provided on the ends of the table pivot shaft 166 and are engaged within one of the guideways 168 of the double track guide members 162. The rollers 164 serve as guide followers, as will be described.

The primary table positioning mechanism is substantially the same as previously described and includes the same power cylinder 60', connector or coupling 70', and operating links 74' and 76'. The operating links are longer than in the previous structure but otherwise are substantially the same. The lower link 74' is secured to a frame bracket 88' and the upper link 76' includes an elongated slot 90' engaged with a depending table bracket, as in the other structure. The power cylinder 60' is pivotally mounted to the conveyor frame 158 on a pivot connection 66', as before.

The secondary table positioning mechanism is similar to that of the previously described structure and includes the power cylinders 102' and the same type operating links 112' and 114'. The table supporting member 92' is also provided and includes the spaced arms 94' and 96' between which the cylinder 102' is pivotally mounted. The operating links 112' and 114' are reversed in the modified structure so that link 114', which includes the spaced straps 118' and 120', is engaged between the power cylinder coupling 110' and the table support 92'. The modified structure requires that rollers 170 be provided on the ends of the link engaged pin 111' and that these rollers be received in the other guideway 172 of the double track guide members 162. The lower end 174 of the guideway 172 provides the support stop for holding the dump table 160 disposed in a horizontal position, as will be described.

The upper end of the double track guide members 162 is formed to provide an arcuate curve 176 for the guideways 168. The guide members 162 are also formed to include an offset or detent space 178 within the guideways 172.

The function of the parts of the modified structure is best described in following through the operation of the modified dump table operating mechanism.

Operation of modification

When the dump table supporting knee-brace formed by operating links 112' and 114' is erected, the dump table 160 is supported in a horizontally disposed position, as shown in full lines by Fig. 7. The knee-brace of links 112' and 114' distributes the load of the dump table 160 through the operating links to the guideway 172. The links 112' and 114' are in an over center relation so that the load is removed from the power cylinder 102', in its fully retracted position, and is carried principally on the end stop 174 of the guideway 172. No load is imposed on the other power cylinder 60'.

The dump table 160, in this position, is aligned with the upper guide tracks 156 of the pallet conveyor and is disposed to receive a pallet carrier and its load.

A simple pallet carrier 180 has been shown in Fig. 8. The pallet carrier includes a platform base 182, on which a mold and its casting are disposed, and has rotatable wheels 184 mounted within supporting yokes 186 secured to the underside of the pallet base. The wheels 184 are engaged with, and ride on, the guide rails 49' of the dump table as shown.

After the pallet carrier is received on the dump table 160 the primary power cylinder 60' is actuated. The power cylinder 60' erects the operating links 74' and 76' to the phantom line position shown by Fig. 7. In so doing, the dump table 160 is lifted vertically and is guided by rollers 164 and 170, in guide-ways 168 and 172 respectively, to assume the tilted dump position shown in phantom lines. The roller 170 falls into the detent space 178 and the load of the dump table 160 is thereby removed from the primary operating mechanism. The secondary operating mechanism has traveled with the dump table 160 to the dump position, just as previously described in regard to the other structure.

When the power cylinder 60' is again activated, to return the dump table 160, the roller 170 rolls out of the detent space 178. The table is then returned to the horizontally disposed position. When such a position is reached the secondary power operating cylinder 102' is actuated. This causes the knee-brace of links 112' and 114' to be collapsed and the dump table 160 is quickly moved into alignment with the pallet return track 154.

In both structures which have been described and illustrated the operating mechanisms are substantially the same and include the same interrelation of parts and cooperate in substantially the same manner. The only principal difference is in such changes as permit the dump table 160 of the modified structure to be lifted, as well as tilted.

While a preferred embodiment of this invention and a modification thereof has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, and said secondary table-positioning mechanism including power actuated means for moving said table and unloaded pallet between said transfer and return tracks.

2. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and casting to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanism each including pivotally mounted power cylinders having pivotally connected operating links engaged therewith, said table including a depending stop disposed to engage said frame, and the operating links of said secondary table-positioning mechanism being operatively connected between the free end of said stop and said table and as aligned forming a table supporting brace holding said table aligned with said pallet transfer track upon the engagement of said stop with said frame.

3. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanism each including pivotally mounted power cylinders having pivotally connected operating links engaged therewith, said table including a depending stop disposed to engage said frame, and the operating links of said secondary table-positioning mechanism being operatively connected between the free end of said stop and said table and as aligned forming an over center table supporting brace holding said table aligned with said pallet transfer track upon the engagement of said stop with said frame, and said power cylinder of said secondary table-positioning mechanism being operative to pivotally break said over center table supporting brace and to move said table relative to said stop and into aligned relation with said pallet return track.

4. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanisms each including pivotally mounted power cylinders having pivotally connected operating links engaged therewith, a lost motion connection provided within said primary table-positioning mechanism for permitting inactivating the power cylinder thereof and providing for subsequent table movement by said secondary table-positioning mechanism independent thereof and relative thereto.

5. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanisms each including pivotally mounted power cylinders having pivotally connected operating links engaged therewith, a lost motion connection provided between said table and said primary table-positioning mechanism for permitting inactivating the power cylinder thereof and providing for subsequent unresisted power actuation of said table by said secondary table-positioning mechanism.

6. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanisms each including pivotally mounted power cylinders having pivotally connected operating links engaged therewith, a lost motion connection provided between said table and said primary table-positioning mechanism for permitting inactivating the power cylinder thereof and providing for subsequent unresisted power actuation of said table by said secondary table-positioning mechanism, said lost motion connection providing a stop limiting the movement permitted said table by said secondary table-positioning mechanism to an aligned relation with said pallet return track.

7. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, said power actuated means of said table-positioning mechanism each including pivotally mounted power cylinders having pivotally connected operating links engaged therewith, said table including a depending stop disposed to engage said frame, and the operating links of said secondary table-positioning mechanism being operatively connected between the free end of said stop and said table and as aligned forming a table supporting brace holding said table aligned with said pallet transfer track upon the engagement of said stop with said frame, said depending stop and that part of said frame engaged thereby receiving spacer means therebetween for adjusting the position of said table into alignment with said pallet transfer track.

8. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, table elevating guide means secured to said frame, guide followers secured to said table and engaged with said guide means, said guide means being formed to dispose said table in a tilted position near the end of the travel of said guide followers thereon, said primary table-positioning mechanism having the operating links thereof formed to elevate and tilt said table in the course of the guided movement thereof on said guide means.

9. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising, a pivotal connection securing one end of said dump table to said support frame, a primary table-positioning mechanism and a secondary table-positioning mechanism operatively connected near the other end of said table, said primary table-positioning mechanism being interconnected between said support frame and said table, said secondary table-positioning mechanism being mounted on and carried by said table, said primary table-positioning mechanism including power actuated means for moving said table and loaded pallet between said pallet transfer track and said tilted position, said secondary table-positioning mechanism including power actuated means for moving said table and unloaded pallet between said transfer and return tracks, table elevating guide means secured to said frame, guide followers secured to said table and engaged with said guide means, said guide means being formed to horizontally shift and to tilt said table near the end of the travel of said guide followers thereon, said primary table-positioning mechanism having the operating links thereof formed to elevate and tilt said table in the course of the guided movement thereof on said guide means.

10. A mold carrier dumping device comprising, a support frame, a tilt table pivotally mounted on said frame, and operating mechanism for disposing said table in alignment with a carrier supply track, raising one end of said table to dump a mold from a carrier received thereon, and lowering said table into alignment with a carrier return track: said operating mechanism comprising a power actuator operatively interconnected between said frame and said table for raising said table and a loaded carrier received thereon, a knee-brace carried by said table and disposed for engagement with said frame for preventing the lowering of said table, and means mounted on said table and operatively engaged with said knee-brace for collapsing said knee-brace and permitting said table to assume a position aligned with said carrier return track.

11. A mold carrier dumping device comprising, a support frame, a tilt table pivotally mounted on said frame, and operating mechanism for disposing said table in alignment with a carrier supply track, raising one end of said table to dump a mold from a carrier received thereon, and lowering said table into alignment with a carrier return track: said operating mechanism comprising a power actuator operatively interconnected between said frame and said table for raising said table and a loaded carrier received thereon, a knee-brace carried by said table and disposed for engagement with said frame for preventing the lowering of said table, and means mounted on said table and operatively engaged with said knee-brace for collapsing said knee-brace and lowering said table to a position aligned with said carrier return track, said means being also operative to reset said knee-brace and dispose said table in alignment with said carrier supply track.

12. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism, stop means carried by said table, mounted for relative movement with respect to said table and disposed to engage said frame; said secondary table-positioning mechanism being carried by said table and operatively connected between said table and stop means and in one position preventing said relative movement; said primary table-positioning mechanism being interconnected between said support frame and said table, said primary table-positioning mechanism including power actuated means for moving said table and loaded pallet between said pallet transfer track and said tilted position, and said secondary table-positioning mechanism including power actuated means operable to a second position for permitting said relative movement and moving said table and unloaded pallet between said transfer and return tracks.

13. In a conveyor for transporting and unloading foundry molds and castings from carrying pallets, and comprising a support frame including an upper pallet transfer track and a lower pallet return track having a dump table disposed adjacent the ends of said tracks and tiltable between positions causing said molds and castings to slide off said pallets and positions aligned with said tracks for receiving and returning said pallets: an improvement in the operating mechanism for said table, and comprising; a pivotal connection securing one end of said dump table to said support frame, a primary table-positioning mechanism and a secondary table-positioning mechanism, stop means carried by said table, mounted for relative movement with respect to said table and disposed to engage said frame; said secondary table-positioning mechanism being carried by said table and operatively connected between said table and stop means and in one position preventing said relative movement and in another position permitting said relative movement; said primary table-positioning mechanism being interconnected between said support frame and said table, said primary and secondary table-positioning mechanisms each including an actuating mechanism, one for moving said table between said pallet transfer track and said tilted position, and the other for moving said table between said transfer and return tracks.

References Cited in the file of this patent

UNITED STATES PATENTS 2,681,738     Granath  _____ June 22, 1954